United States Patent [19]

Kamal et al.

[11] Patent Number: 5,188,784
[45] Date of Patent: Feb. 23, 1993

[54] PROCESS FOR LAMINAR POLLYMER EXTRUSION

[75] Inventors: Musa R. Kamal, Westmount, Canada; Gunter Lohfink, Brussels, Belgium; Laurent Arghyris; Sassan Hozhabr-Ghelichi, both of Montreal, Canada

[73] Assignee: The Royal Institution for the Advancement of Learning (McGill University), Montreal, Canada

[21] Appl. No.: 597,695

[22] Filed: Oct. 16, 1990

[51] Int. Cl.⁵ .................. B29C 47/06; B29C 47/14
[52] U.S. Cl. .................................. 264/108; 264/171; 264/176.1; 264/210.6; 264/331.19; 425/461
[58] Field of Search .............. 264/176.1, 108, 331.19, 264/210.6; 425/376.1, 381, 467, 461

[56] References Cited

U.S. PATENT DOCUMENTS

| | | | |
|---|---|---|---|
| 3,267,518 | 8/1966 | Juel et al. | 425/467 |
| 3,720,732 | 3/1973 | Sevenich | 264/210.6 |
| 3,873,667 | 3/1975 | Preto et al. | |
| 4,057,610 | 11/1977 | Goettler et al. | 264/108 |
| 4,240,782 | 12/1980 | McPhee et al. | 425/467 |
| 4,410,482 | 10/1983 | Subramanian | |
| 4,731,216 | 3/1988 | Topolski | 425/381 |
| 4,828,915 | 5/1989 | Schroeder et al. | 264/176.1 |

FOREIGN PATENT DOCUMENTS

| | | |
|---|---|---|
| 1146323 | 5/1983 | Canada. |
| 0238197 | 1/1987 | European Pat. Off. |

OTHER PUBLICATIONS

Selar Barrier Resin brochure.
"A Processible Toughened PET for Cost Effective Hydrocarbon and Flavor Barrier", Dr. Linda R. Bateman, Nov. 4, 1986.
"A New Challenger To Present Barrier Resins", Don James, Feb. 18, 1986.
Selar PT Barrier Resin Selector Guide.
Selar PT 4234 data sheet.
Selar Packaging Preview brochure.
Selar Packaging Preview brochure-Agricultural Chemicals Go To Market Safely In Containers Made With Selar RB.
Selar Packaging Preview brochure—Sewell High Barrier Containers ring Zep's Reach To The Marketplace.
Selar PA 3426 data sheet.
Selar OH Selector Guide.
Hold Hydrocarbons In, Keep Packaging Costs Down brochure.
Selar OH 4416 data sheet.
Selar OH 3007 data sheet.
Selar OH 3003 product information sheet.
Selar PT-A Unique Barrier Film For Flexible Packaging, Diane L. McCauley, Sep. 1987.
Multiple Layers For Multiple Markets, Alvin S. Topolski, Oct. 6, 1987.
Selar PT 4368 data sheet.

Primary Examiner—Jeffery Thurlow
Attorney, Agent, or Firm—Jacobson, Price, Holman & Stern

[57] ABSTRACT

In a laminar extrusion, overlapping layers of an EVOH phase are dispersed into a PP or MAPP matrix phase incompatible with the EVOH phase to form a vapor, gas and/or organic liquids barrier. When the matrix phase is a PP phase, MAPP can be added to improve adhesion between the overlapping layers and the matrix phase. MEPR and/or PE can also be mixed with the EVOH and/or PP phase to adjust the mechanical properties of the extrusion. In order to produce the extrusion, a molten polymer blend including bodies of the EVOH phase dispersed in the PP or MAPP phase is first prepared and then extruded through a die unit. In the die unit, a converging extensional flow is produced to lengthen the dispersed bodies of EVOH phase in a first direction while a diverging extensional flow lengthens these bodies in a second direction transversal to the first one. Such lengthening of the bodies produces in the extrusion the overlapping layers of EVOH phase.

4 Claims, 15 Drawing Sheets

PP/EVOH (80/20)

PP/EVOH (90/10)

MAPP/EVOH (70/30)

MAPP/EVOH (80/20)

PP

EVOH

MAPP I $T_{Die} = 230°C$

70/30 wt%

$T_{Die} = 230°C$

80/20 wt%

$T_{Die} = 230°C$

90/10 wt%

$T_{Die} = 200°C$

70/30 wt%

$T_{Die} = 200°C$

80/20 wt%

$T_{Die} = 200°C$

90/10 wt%

$T_{Die} = 230°C$

SURFACE $T_{Die} = 230°C$

INTERMEDIATE $T_{Die} = 230°C$

CORE $T_{Die} = 200°C$

SURFACE $T_{Die} = 200°C$

INTERMEDIATE $T_{Die} = 200°C$

CORE

METERING SCREW

MIXING SCREW

METERING SCREW

SURFACE

METERING SCREW

INTERMEDIATE

METERING SCREW

CORE

MIXING SCREW

SURFACE

MIXING SCREW

INTERMEDIATE

MIXING SCREW

CORE

90/10 wt%

80/20 wt%

70/30 wt%

50/25/25 wt%

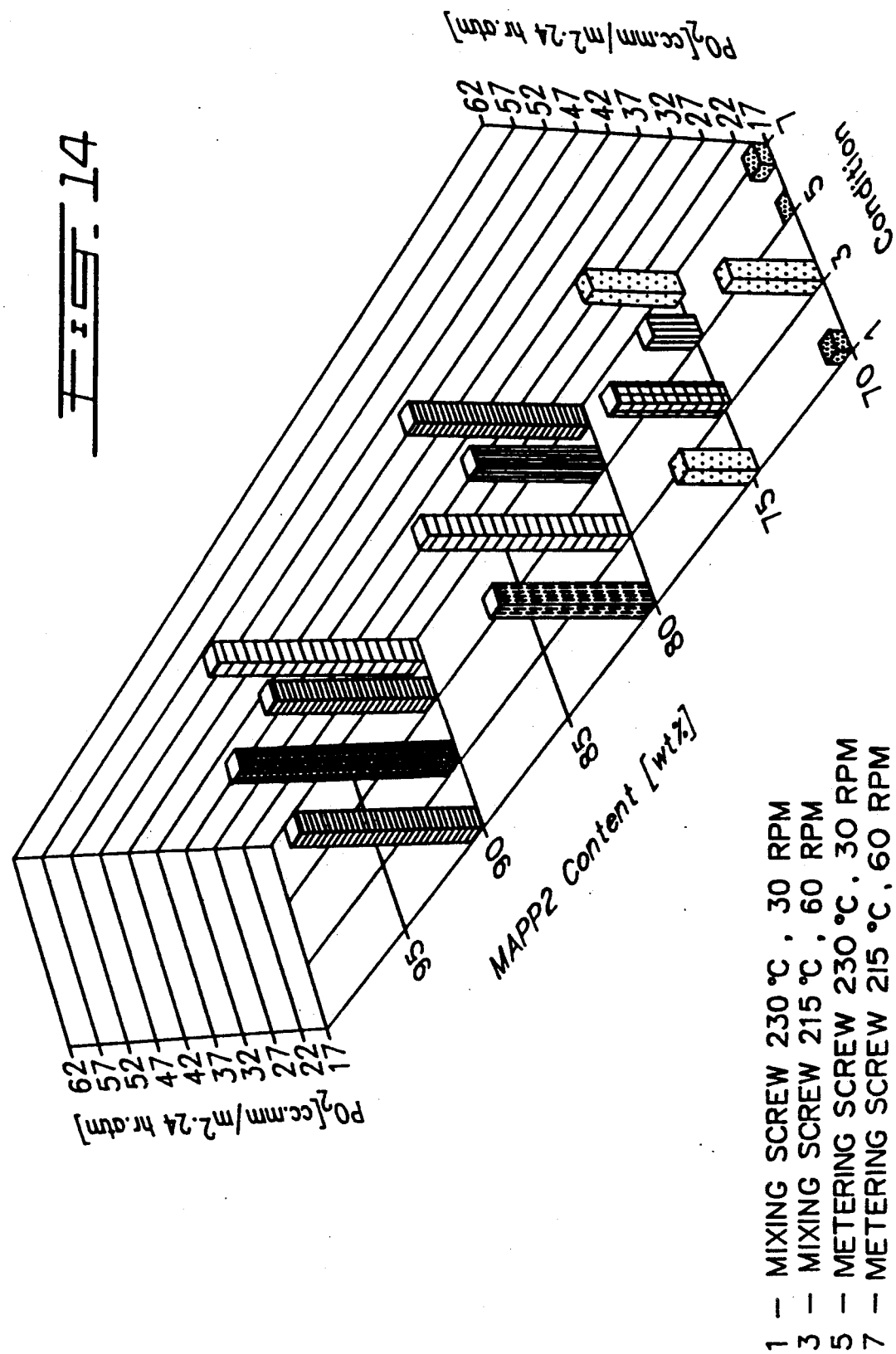

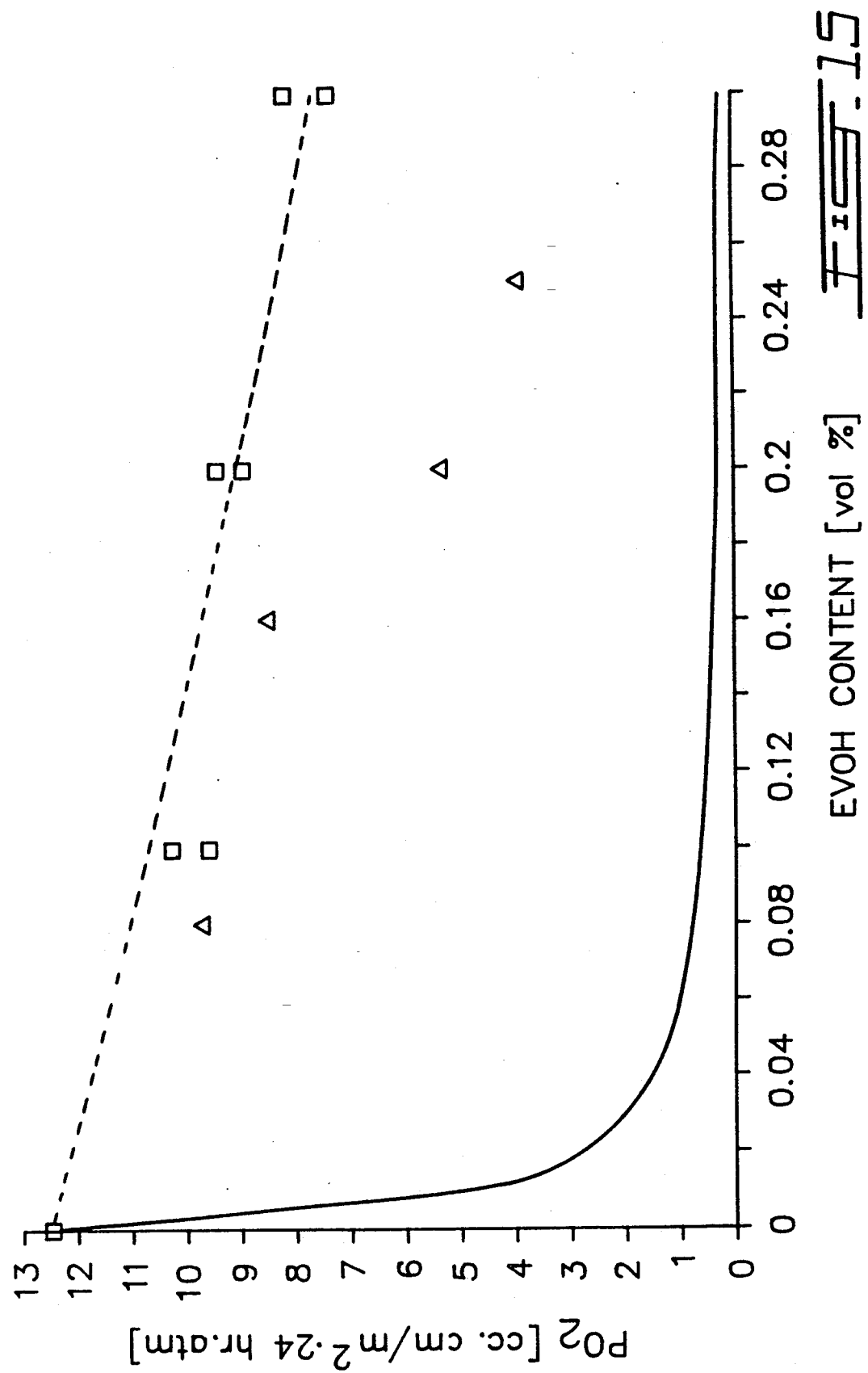

PROCESS FOR LAMINAR POLLYMER EXTRUSION

BACKGROUND OF THE INVENTION

1. Field of the Invention

The present invention relates to a laminar polymer extrusion presenting vapor, gas and/or organic liquids barrier capabilities. The invention also extends to a process and die unit capable of producing this laminar extrusion.

The laminar extrusion in accordance with the present invention is particularly useful to manufacture containers for foods, beverages, pharmaceuticals, etc.

2. Brief Description of the Prior Art

In the industry, the need for enhancement of product properties and processing behavior, and for meeting government regulations has motivated the development of materials with improved performance. Polymers and their derivatives have provided solutions to material related problems in many situations, with both economic and technical advantages. For example, polymer structures including thin layers of different polymers, a mixture of many polymers, or additives have been developed.

In particular, the use of polymers in the packaging industry is presently increasing steadily. Polymers offer many advantages over other conventionally used packaging materials. Amongst others, their low cost, relative ease of processing, flexibility, good physical properties, and light weight can be mentioned. An important obstacle in the use of polymers in this industry, however, is the high permeability of a layer made of only one polymer to various gases and solvents.

To overcome that problem, high-gas-barrier coextruded bottles have been developed and this food packaging product line is growing very rapidly. A key polymer used in the production of such bottles is ethylene vinyl-alcohol copolymer (EVOH) which is generally approved for food-contact applications. EVOH is resistant to permeation of gases such as oxygen and carbon dioxide, of vapors and of organic liquids including solvents. However it presents the shortcomings of being moisture sensitive, and having reduced oxygen permeation resistance with increasing relative humidity. Thus, during manufacture, a layer of EVOH is sandwiched between layers of one or more common polymers such as polyethylene (PE) and polypropylene (PP). PE and PP have excellent water barrier properties but low oxygen permeation resistance. The combination of EVOH and PE or PP in a multi-layer structure with the incorporation of adhesive tie-layers between EVOH and the polyolefin(s) results in structures exhibiting mechanical strength, light weight and excellent barrier properties.

The multi-layer manufacture techniques presently available require multi-layer extrusion dies, additional extruders, and appropriate adhesive tie-layers. Although multi-layer extrusion products satisfy many of the requirements in the packaging industry, they still involve important capital investments to purchase the equipment, require complex process optimization and control, and present limitations in recycling of regrind or waste products.

Polymer blends constitute an interesting alternative to multi-layer extrusion to achieve desirable product properties. They have been used extensively by the plastics industry to meet some stringent requirements of performance and cost.

Polymer blends usually include two or more polymers, mixed physically together. Compatible (soluble) blends yield polymer alloys, whereas most of the commercial blends comprise incompatible (insoluble) polymers to form a dispersion of one polymer in the other one. The behavior of a polymer blend product will depend, to a large extent, on the microstructure of the blend, reflecting the size and configuration of the dispersed phase, and the nature of the interface between the two phases.

It should be pointed out here that in the present specification and in the appended claims the term "incompatible" qualifies phases which cannot dissolve completely in each other although a certain degree of compatibility can exist between the two phases to achieve adhesion at the interface of the two phases.

As an example, U.S. Pat. No. 4,410,482 (SUBRAMANIAN) issued on Oct. 18, 1983, proposes a method for producing a laminar structure from a polymer blend.

In a first step is prepared an heterogeneous blend of 60% to 95% by weight of polyolefin, 5% to 40% by weight of a condensation polymer incompatible with the polyolefin, and 0.25% to 12% by weight of a so called compatibilizer advantageously formed by an alkylcarboxyl-substituted polyolefin.

The heterogeneous blend is heated above the highest melting point of the blend constituents. At this temperature, the blend melts so that it can be subsequently formed by stretching a body of melt blend and cooling the so stretched body until it reaches a temperature below the lowest melting point of the blend constituents. An elongation of 100 to 500 percent of the body in at least one direction is required. The body of molten blend is elongated by means of conventional equipments such as low shear and low mixing extruders, die lips, pressing rollers or platens, etc.

The polyolefin constitutes a continuous matrix phase while the condensation polymer incompatible with the polyolefin presents the form of a discontinuous distribution of thin, substantially two-dimensional, parallel and overlapping layers. The compatibilizer, namely the alkylcarboxyl-substituted polyolefin, is present between the matrix phase and the layers of condensation polymer to adhere these matrix and layers together.

In the multi-layer extrusion processes, the necessary equipment is complex and expensive, and at least one adhesive tie-layer is necessary. Another important drawback of multi-layer extrusion processes is that they do not enable recycling of the regrind and of the extrusion itself after use. Production of laminar structures by extruding a molten polymer blend simplifies the necessary equipment, but the prior art techniques require elaborate screw design and delicate control of temperature along the barrel and screw of the extruder to produce and maintain the layered structure in the screw region. Another important drawback of prior art techniques is the limited flexibility with regard to the choice of blend components and the control of distribution and morphology of the dispersed phase in the matrix.

OBJECTS OF THE INVENTION

A first object of the present invention is a laminar extrusion in which overlapping layers of an EVOH phase are dispersed into a PP or MAPP (maleated polypropylene) matrix phase to form in the latter phase a vapor, gas and/or organic liquids barrier.

Another object of the present invention is a process enabling production of this laminar extrusion from a polymer blend in a flexible fashion with minimum restrictions regarding screw design and temperature control while allowing broad control over the distribution and morphology of the dispersed phase in the matrix phase.

A third object of the invention is a process capable not only to produce the laminar extrusion in accordance with the present invention but also to fully recycle the regrind and the extrusion itself after use.

A further object of the present invention is a simple die unit having a configuration suitable to produce in conjunction with a conventional metering or mixing screw extruder a laminar extrusion according to the invention.

SUMMARY OF THE INVENTION

More specifically, in accordance with the present invention, there is provided a laminar extrusion comprising overlapping layers of an EVOH phase dispersed into a PP matrix phase incompatible with the EVOH phase to form in the matrix phase a vapor, gas and/or organic liquids barrier.

Advantageously, a compatibilizer including maleated polypropylene forms an interface between the overlapping layers of EVOH phase and the matrix phase to improve adhesion between these layers and the polypropylene.

The present invention also relates to a laminar extrusion comprising overlapping layers of an EVOH phase dispersed into a MAPP matrix phase incompatible with the EVOH phase to form in this matrix phase a vapor, gas and/or organic liquids barrier.

An impact modifier including maleated ethylene-propylene rubber (MEPR) can be mixed with the PP or MAPP matrix phase and/or the EVOH phase to adjust as desired the mechanical properties of the laminar extrusion. This impact modifier may further include high density polyethylene.

The subject invention further relates to a process for producing a laminar polymer extrusion, comprising the steps of:

preparing a molten blend including bodies of a first polymer phase dispersed in a matrix polymer phase incompatible with the first phase;

extruding the molten blend to produce the extrusion, which extruding step including lengthening the dispersed bodies of the first polymer phase in a first direction and also in a second direction transversal to the first one to produce in the extrusion a laminar structure including overlapping layers of the first polymer phase dispersed in the matrix phase; and solidifying the extruded blend sufficiently rapidly to preserve the laminar structure.

Advantageously, lengthening of the dispersed bodies in the first direction comprises producing a converging extensional flow of the molten blend, while lengthening of the dispersed bodies in the second direction comprises producing a diverging extensional flow.

In accordance with the present invention, there is also provided a die unit for extruding a molten blend including bodies of a first polymer phase dispersed in a matrix polymer phase incompatible with the first phase in order to produce a laminar extrusion. The die unit comprises a die body formed with a cavity through which the molten blend is extruded, and the latter cavity comprises first means for lengthening the dispersed bodies of the first phase in a first direction and also second means for lengthening these dispersed bodies in a second direction transversal to the first one so as to produce in the extrusion a laminar structure including overlapping layers of the first polymer phase dispersed in the matrix phase.

In accordance with preferred embodiments of the die unit, the first means comprises the cavity formed with a conical section to produce a converging extensional flow capable of lengthening the dispersed bodies of the first phase in the first direction, the second means comprises the cavity formed with a flared section of generally even small thickness to produce a diverging extensional flow capable of lengthening these dispersed bodies in the second direction, the cavity further comprises a generally cylindrical section to interconnect the conical and flared sections, the generally cylindrical section has a substantially circular cross section, the flared section has a substantially rectangular cross section, and the cavity comprises a transition section for interconnecting the generally cylindrical section with the flared section, which transition section having a cross section gradually changing from the said substantially circular cross section to the said substantially rectangular cross section.

According to another preferred embodiment of the die unit, the cavity comprises a slit section of generally rectangular cross section, and the first and second means comprise the cavity formed with another section having a cross section gradually changing from a circular cross section to the generally rectangular cross section of the slit section to produce a converging extensional flow of the blend in the first direction and a diverging extensional flow of this blend in the second direction.

In accordance with a further embodiment of the die unit, the cavity is a conical cavity having a diameter which increases in one direction and a thickness which decreases in the same direction to produce a converging extensional flow of the blend in the first direction and a diverging extensional flow of this molten blend in the second direction.

By lengthening the bodies of the dispersed phase in the first and second directions, the process and die unit in accordance with the present invention easily produce the laminar structure of the extrusion according to the invention. These process and die unit also enable full recycling of the regrind and extrusion.

The objects, advantages and other features of the present invention will become more apparent upon reading of the following non restrictive description of a preferred embodiment thereof, given by way of example only with reference to the accompanying drawings.

BRIEF DESCRIPTION OF THE DRAWINGS

In the appended drawings:

FIG. 14 is a three-dimensional graph of the permeability to oxygen for a MAPP2/EVOH blend as a function of the blend composition and the processing conditions; and FIG. 15 is a graph of the permeability to oxygen in function of the volume content of EVOH for samples produced with a batch mixer and with the die unit according to the invention.

DETAILED DESCRIPTION OF THE PREFERRED EMBODIMENT

The preferred embodiment of the present invention is related to the production, by extrusion of a polymer blend through a slit die unit, of a laminar structure of an EVOH phase dispersed in a PP or MAPP matrix (continuous) phase. PP or MAPP gives to the extrusion good mechanical properties and barrier characteristics to moisture while EVOH gives to that extrusion good barrier properties, particularly to oxygen, carbon dioxide and organic vapors.

Figure 1:
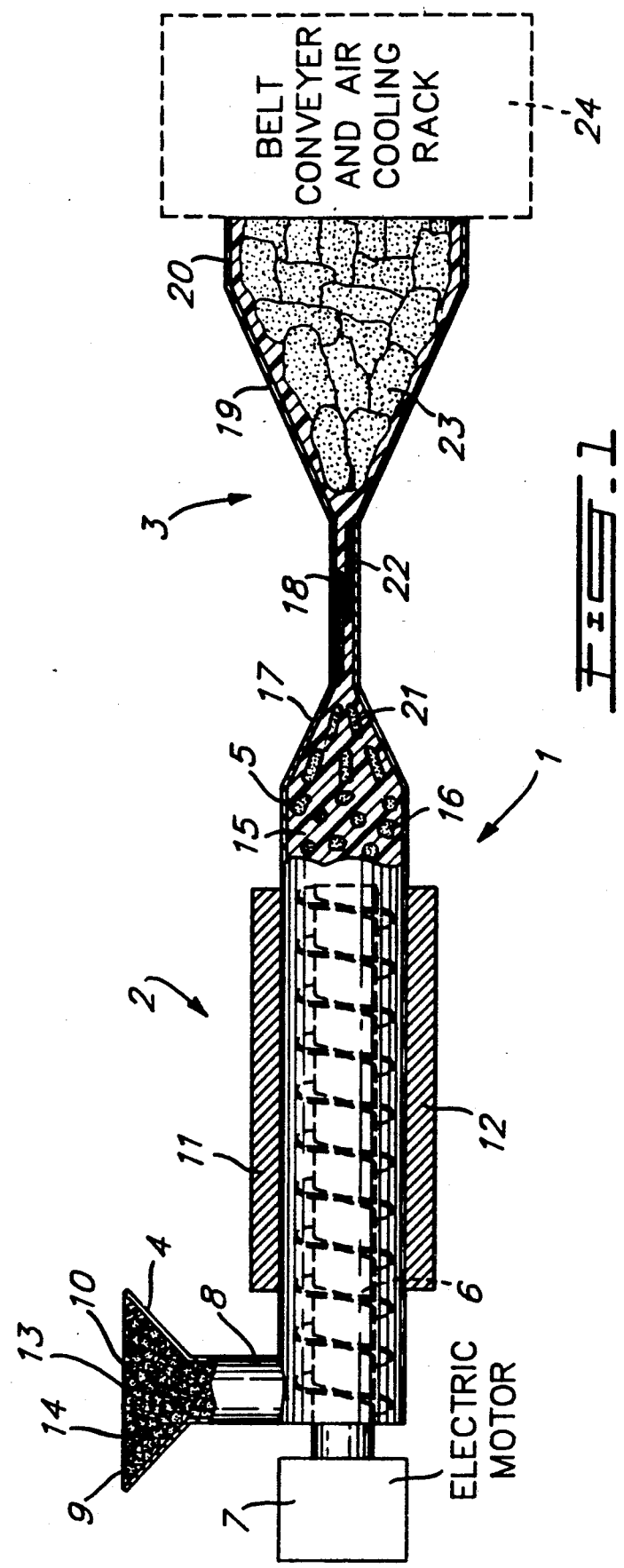
FIG. 1 is a schematic of an apparatus capable of producing laminar extrusions in accordance with the present invention from a polymer blend.

FIG. 1 is a schematic of an apparatus, generally identified by the reference numeral 1, capable of producing the laminar extrusion in accordance with the present invention.

The apparatus 1, as illustrated in FIG. 1, generally comprises an extruder unit 2 and a slit die unit 3.

The extruder unit 2 comprises a hopper 4 to receive the raw materials, an elongated cylindrical body 5 made of heat conductive material, a metering or mixing endless screw 6 (a metering or mixing screw can be used in the present invention) disposed within the body 5 and rotating about the longitudinal axis of that body, a variable speed electric motor 7 to drive the rotating screw 6, a vertical conduit 8 interconnecting the hopper 4 and the inside of the elongated body 5, and heaters such as 11 and 12 mounted on the outside of the cylindrical body 5 to produce heat propagating through that heat conductive body 5 in order to melt the raw materials therein.

In operation, pellets of PP or MAPP such as 9 and of EVOH such as 10 are poured into the hopper 4. As will be seen in the following description, pellets of a compatibilizer such as 13 and of an impact modifier such as 14 can also be poured into the hopper 4 together with the pellets of PP or MAPP and EVOH. The pellets of different materials 9 and 10 and eventually 13 and 14 are preferably mixed together before being poured in the hopper 4.

The pellets are transferred by gravity from the hopper 4 to the inside of the body 5 through the vertical conduit 8. The pellets then reach the metering or mixing screw 6 and move toward the die unit 3. If screw 6 is a mixing screw, the pellets of different materials are more intensively mixed together.

While they move toward the die unit 3, the pellets are heated by the heaters 11 and 12 so that when they reach the free end of the screw 6 they are in molten state.

As PP or MAPP and EVOH are incompatible, the molten blend 15 at the free end of the screw 6 is formed of a PP or MAPP matrix phase in which an EVOH phase is dispersed. As illustrated in FIG. 1, the dispersed EVOH phase comprises a plurality of molten bodies such as 16 of variable configurations.

The die unit 3 comprises a cavity therein defining a conical section 17, a cylindrical section 18, a thin flared section 19 of substantially even thickness, and a slit section 20. In order to simplify FIG. 1, the sections 19 and 20 are oriented vertically although they are normally oriented horizontally.

The conical section 17 has an inner diameter reducing from that of the cylindrical body 5 to that of the cylindrical section 18. Accordingly, the molten blend 15 injected into the conical section 17 by the rotating screw 6 is subjected to a converging extensional flow which lengthens the dispersed bodies 16 of EVOH phase in the direction of flow (see 21 in FIG. 1). Also, the converging extensional flow in the region of the cylindrical section 18 close to the flared section 19 (as will be seen hereinafter) further lengthens the extended bodies 21 of EVOH phase again in the direction of flow (see 22). Subsequently, the diverging extensional flow in the thin flared section 19 widens the elongated bodies 22 in the plane of the latter section 19 to form very thin layers of EVOH phase dispersed in the PP or MAPP matrix phase. The layers 23 have different configurations but are large enough to overlap each other (see 23 in FIG. 1) and thereby create in the PP or MAPP matrix phase the EVOH barrier. In the slit die section 20, shear flow prevails. Accordingly, to produce an extruded, laminar structure according to the present invention, the bodies 16 of EVOH phase dispersed into the PP or MAPP matrix phase should be lengthened in two different but coplanar directions, namely in the direction of flow and in a direction transversal to that of the flow, in a plane parallel to the large surface of the product.

Although it is not shown in the appended drawings, heating of the die unit 3 can be required to obtain adequate viscosity of the molten polymer blend 15 upon extrusion.

The solidification of the strip extrusion from the outlet of the slit die section 20 must be sufficiently rapid to preserve the laminar structure, that is to freeze the overlapping layers 23 of EVOH phase in the PP or MAPP matrix phase. A variable speed flat belt conveyer can be used in conjunction with an air cooling rack as schematically illustrated at 24 in FIG. 1. Such a cooling system is well known in the art and will accordingly not be further described.

When pellets 13 of compatibilizer are present in the hopper 4, they are heated, melt and concentrate in the interface between the dispersed and matrix phases to adhere the dispersed layers 23 to the matrix phase. Indeed, the layers 23 may shrink upon cooling and then the compatibilizer can be required to ensure adequate adherence. As will be discussed in the following description, the compatibilizer can be for example maleated polypropylene when a PP matrix phase is used.

To change the mechanical properties of the extruded material, pellets 14 of impact modifier can be added into the hopper 4. The latter pellets are heated, melt and mix with the PP or MAPP and/or EVOH phase to increase or reduce the rigidity of the extrusion. For instance, MEPR and PE can be used as impact modifier as will be discussed in the examples presented in the following description.

Figure 2:
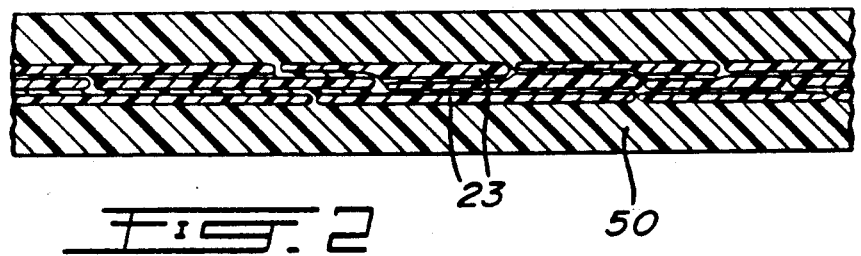
FIG. 2 is a cross sectional view of a laminar extrusion according to the present invention.

FIG. 2 is a cross sectional view of a strip extrusion produced with the apparatus of FIG. 1, showing the laminar structure in accordance with the present invention. The overlapping layers 23 of EVOH phase dispersed into the PP or MAPP matrix phase 50 concentrate in the middle region or core of the strip extrusion. As can be appreciated by one skilled in the art, this is caused by the laws of flow mechanics through the die unit 3; balance of the viscosities between the EVOH and PP or MAPP phases forces the EVOH phase away from the inner walls of the die unit. FIG. 2 clearly shows the vapor, gas and organic liquids barrier formed by the overlapping layers 23 of EVOH phase dispersed in the PP or MAPP matrix phase 50.

Morphological studies, including a study of morphology development inside the die unit 3 and studies of the effects of processing conditions on the morphology of the final extrusion material, revealed that the laminar structure of the dispersed EVOH phase in the PP or MAPP matrix phase is a result of the design of the die unit. Processing conditions influence mainly the shape and dimensions of the laminar core region of the extrudate.

Figure 3A:
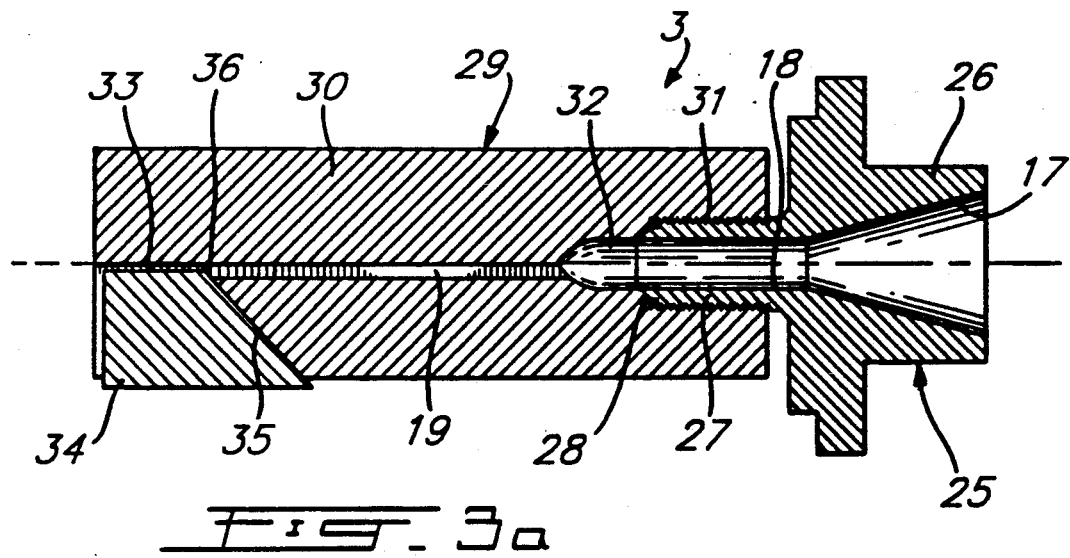
FIG. 3a and 3b illustrate a first embodiment for a die unit forming part of the apparatus of FIG. 1.
Figure 3B:
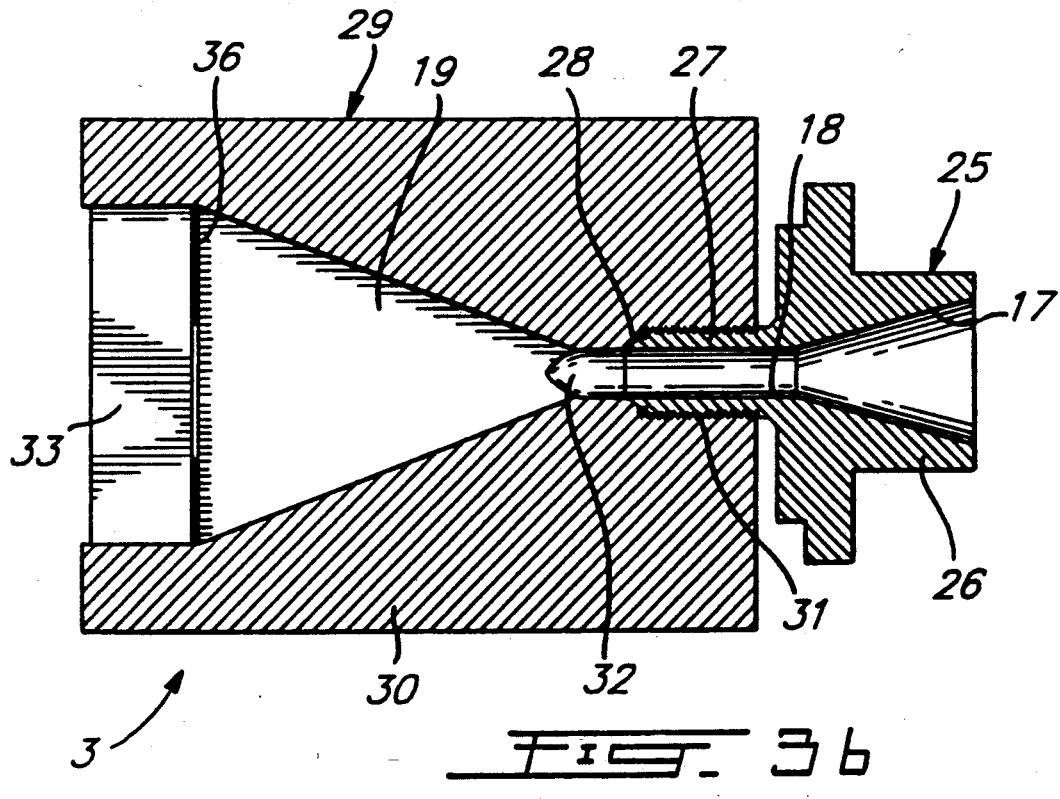
Figure 6A:
FIGS. 6a, 6b, 6c and 6d are SEM (Scanning Electron Microscope) micrographs of fractured polymer samples produced from a polymer blend melted and mixed in a batch mixer, subsequently cooled and then compression molded, these samples having different PP/EVOH or MAPP/EVOH volume ratios.
Figure 6B:
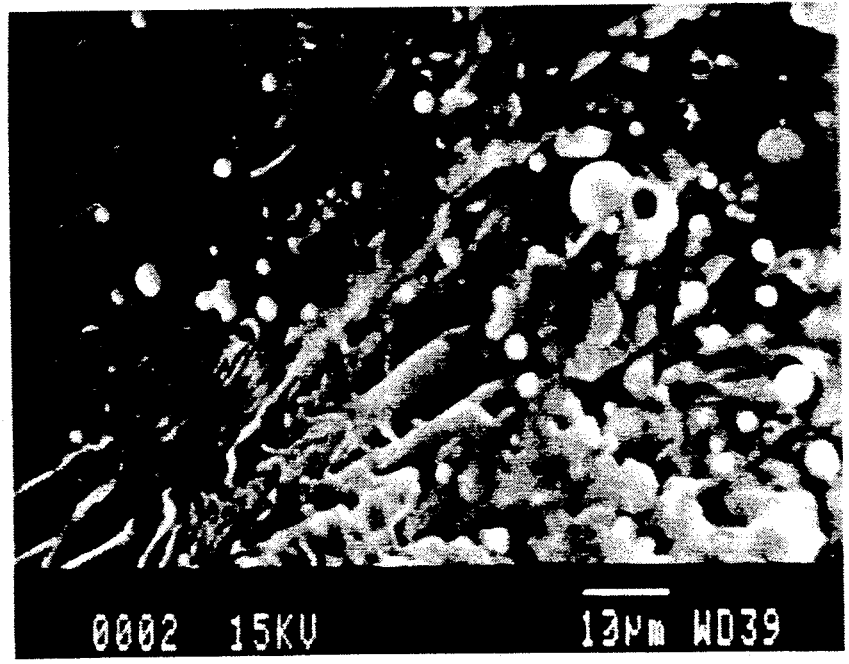
Figure 6C:
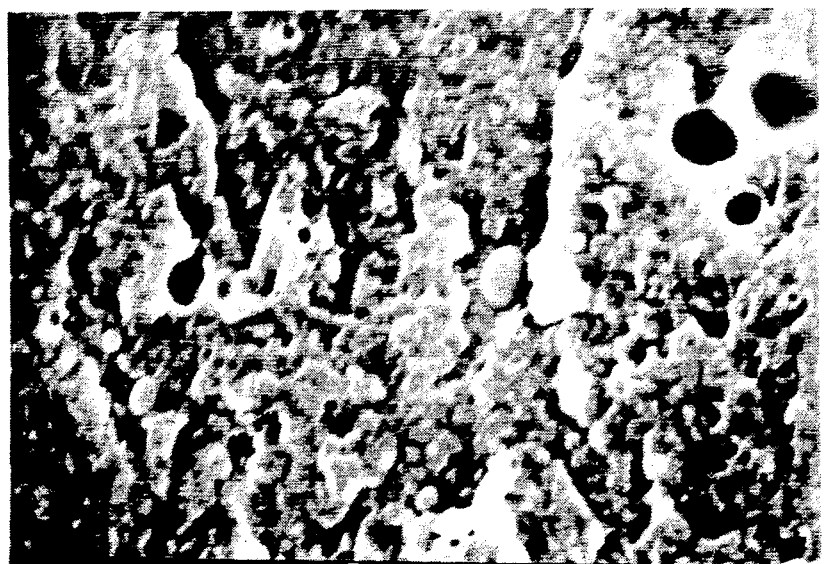
Figure 6D:
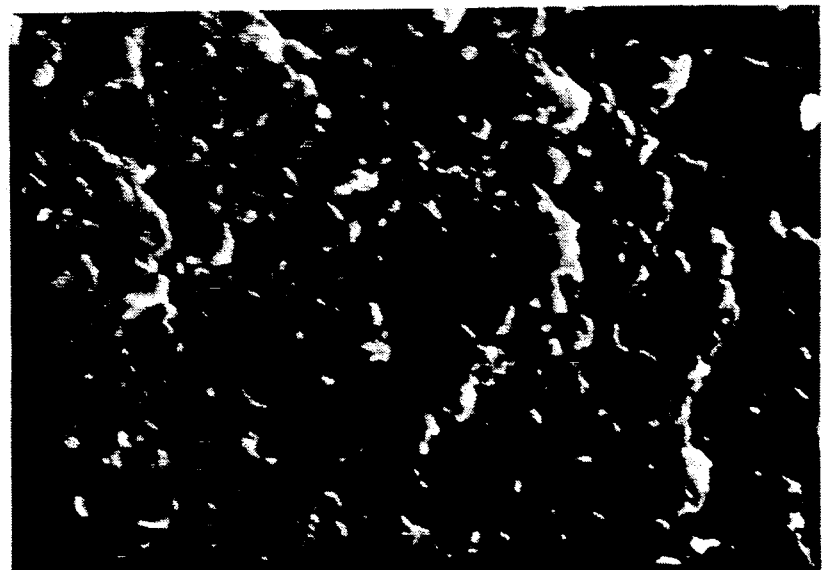

FIGS. 3a and 3b detail the structure of the die unit 3 of FIG. 1.

As illustrated in these two Figures, the die unit 3 includes an adapter 25 to connect it to the extruder unit such as 2 in FIG. 1, for example of the single-screw type. As it is of conventional design, the extruder unit 2 will not be further described.

The adapter 25 consists of a body defining a distant portion 26 structured to be mounted onto the extruder unit 2, and a proximate, outwardly threaded cylindrical and tubular portion 27 on which the die 29 is screwed. The free end of the tubular section 27 is tapered (see 28).

The adapter 25 is formed with an internal cavity defining the conical section 17 and the cylindrical section 18.

The die 29 is formed of a body 30 with a cavity therein. The latter cavity includes a cylindrical section 31 which is threaded to be screwed onto the tubular portion 27 of the adapter 25. The proximate end of the cylindrical section 31 is also tapered in order to form a sealed joint with the tapered free end 28 of the tubular portion 27 when the latter portion is screwed into the section 31.

The cavity of the body 30 further defines the flared section 19 of even and relatively small thickness. This section 19 is connected to the cylindrical section 18 through a transition section 32 having a cross section gradually changing from circular (near the section 18) to rectangular (near section 19). As mentioned hereinabove, converging extensional flow prevails in that transition section to further lengthen the elongated bodies 22 (FIG. 1). The section 19 flares from the transition section 32 toward the slit die section 20 (FIG. 1) defining a gap 33 of adjustable thickness. The thickness of the latter gap 33 is adjusted by sliding an oblique face of a trapezoidal body 34 on an oblique face 35 of the body 30. After the thickness of the gap 33 of section 20 has been adjusted to the desired thickness for the strip extrusion, the body 34 is locked in position on the body 30 through suitable fasteners (not shown). As can be seen in FIGS. 3a and 3b, the oblique face of the body 34 defines a transition slope 36 between the sections 19 and 20. In the region of slope 36, converging extensional flow becomes dominant again to further stretch and lengthen the layers 23 of EVOH phase in the direction of flow.

Conventionally, both the die 29 and the adapter 25 are made of stainless steel.

Figure 4:
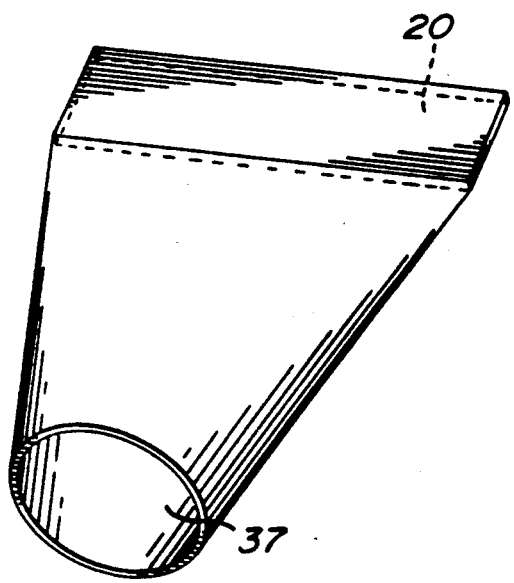
FIG. 4, which is disposed on the same sheet of formal drawings as FIG. 2, is a second embodiment for the die unit of the apparatus of FIG. 1.

FIG. 4 illustrates the configuration of a converging fan that can be used to produce a laminar extrusion in accordance with the present invention. The cavity sections 17, 18 and 19 of the die unit 3 of FIGS. 3a and 3b are replaced by a single cavity 37 defined within a die body (not shown). At one end of that cavity 37, the cross section is circular and has a diameter corresponding to the inner diameter of the body 5 of the extruder unit 2 whereby the cavity 37 can be connected to that extruder unit. The circular cross section of the cavity 37 gradually changes to reach the rectangular one of the slit die section 20. The configuration of the cavity 37 lengthens the bodies of EVOH phase dispersed into the PP or MAPP matrix phase in two different directions, namely in the direction of flow in the die unit and in a direction transversal to that of the flow to thereby produce the extruded, laminar structure in accordance with the present invention. Indeed, converging extensional flow and diverging extensional flow are produced in the cavity 37.

Figure 5:
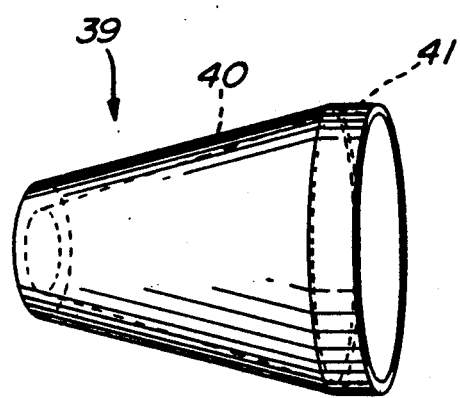
FIG. 5, which is disposed on the same sheet of formal drawings as FIGS. 2 and 4, represents an annular die unit capable of producing a laminar extrusion in accordance with the present invention.

FIG. 5 illustrates an annular die unit 39 formed with an inner cavity defining a first conical section 40 increasing in diameter in one direction but decreasing in thickness in the same direction, and a second cylindrical slit die section 41 of constant diameter and of even, small thickness. Section 40 of the die unit 39 produces both converging extensional flow and diverging extensional flow whereby the bodies of EVOH phase dispersed into the PP or MAPP matrix phase lengthen in two different and perpendicular directions, namely in the direction of flow in the die unit 39 and in a direction transversal to that direction of flow, to thereby produce a tubular and cylindrical laminar extrusion in accordance with the present invention.

The die unit 39 of FIG. 5 can obviously be used in conjunction with an annular extruder (not shown) of conventional design.

The laminar strip or tube extrusion can be further molded using for example vacuum forming and blow molding to manufacture different products such as containers for foods, beverages, pharmaceuticals, etc. presenting good vapor, gas and/or organic liquids barrier characteristics.

Regrind of the laminar extrusion and the extrusion itself after use are fully recyclable. Indeed, particles of regrind and of extrusions can be supplied to the hopper 4 of the extruder unit 2 (FIG. 1) and after melting thereof form a polymer blend including bodies such as 16 of an EVOH phase dispersed in a PP or MAPP matrix phase. This blend can then be extruded to obtain a laminar extrusion in accordance with the invention. Usually, a given proportion of recycled material will be supplied along with fresh raw materials in the hopper 4 of the extruder unit.

EXAMPLE 1

A batch mixer having a working capacity of 260 millilitres (ml) was heated electrically to 200° C. The mixing action was achieved with the help of two rotating roller blades inside the mixer. PP was added to the mixer and mixed under a blanket of nitrogen for 20 minutes. The torque reading normally reached a constant, steady level at that time. Similarly, MAPP, with a maleate content of about 0.1%, was mixed for 20 minutes at 200° C. Samples were removed at the end of 20 minutes. The samples were immediately cooled and placed in sealed plastic pouches and kept at a low temperature to minimize changes with time. Subsequently, the granulated samples were removed and compression molded at 200° C. to yield plaques having 1.5 mm thickness and dimensions 65×65 mm. These samples were then tested to determine their impact resistance at constant impact speeds. Similar tests were carried out where, instead of pure PP or MAPP, dry blends of one of these polymers with EVOH were added to the mixer and mixed for 20 minutes at 200° C. The content of EVOH was varied to obtain the following PP/EVOH or MAPP/EVOH volume ratios 70/30, 80/20, 90/10. Some results of impact tests are summarized in Table I for MAPP. They show that the addition of EVOH to PP or MAPP at these levels produces samples with impact properties comparable to those of PP or MAPP. At 30% levels of EVOH, a deterioration in impact properties was observed.

TABLE I

| Composition (vol. %) | Force (lb) | (N) | Energy (in. lb.) | (J) | Slope (lb/in) | (N/m) |
| --- | --- | --- | --- | --- | --- | --- |
| Processed MAPP | 162 | 721 | 34 | 3.8454 | 562 | 98501 |
| MAPP-EVOH 70-30 | 74 | 329 | 5 | 0.5655 | 504 | 88336 |
| MAPP-EVOH 80-20 | 186 | 828 | 34 | 3.8454 | 622 | 109017 |
| MAPP-EVOH 90-10 | 173 | 770 | 35 | 3.585 | 597 | 104636 |

The SEM (Scanning electron Microscope) micrographs of fractured samples depicted in FIGS. 6a, 6b, 6c and 6d, show that different compositions of blends of EVOH and PP or MAPP produce spherical dispersions of EVOH in PP or MAPP, when the blend is produced in a batch mixer.

Figure 7:
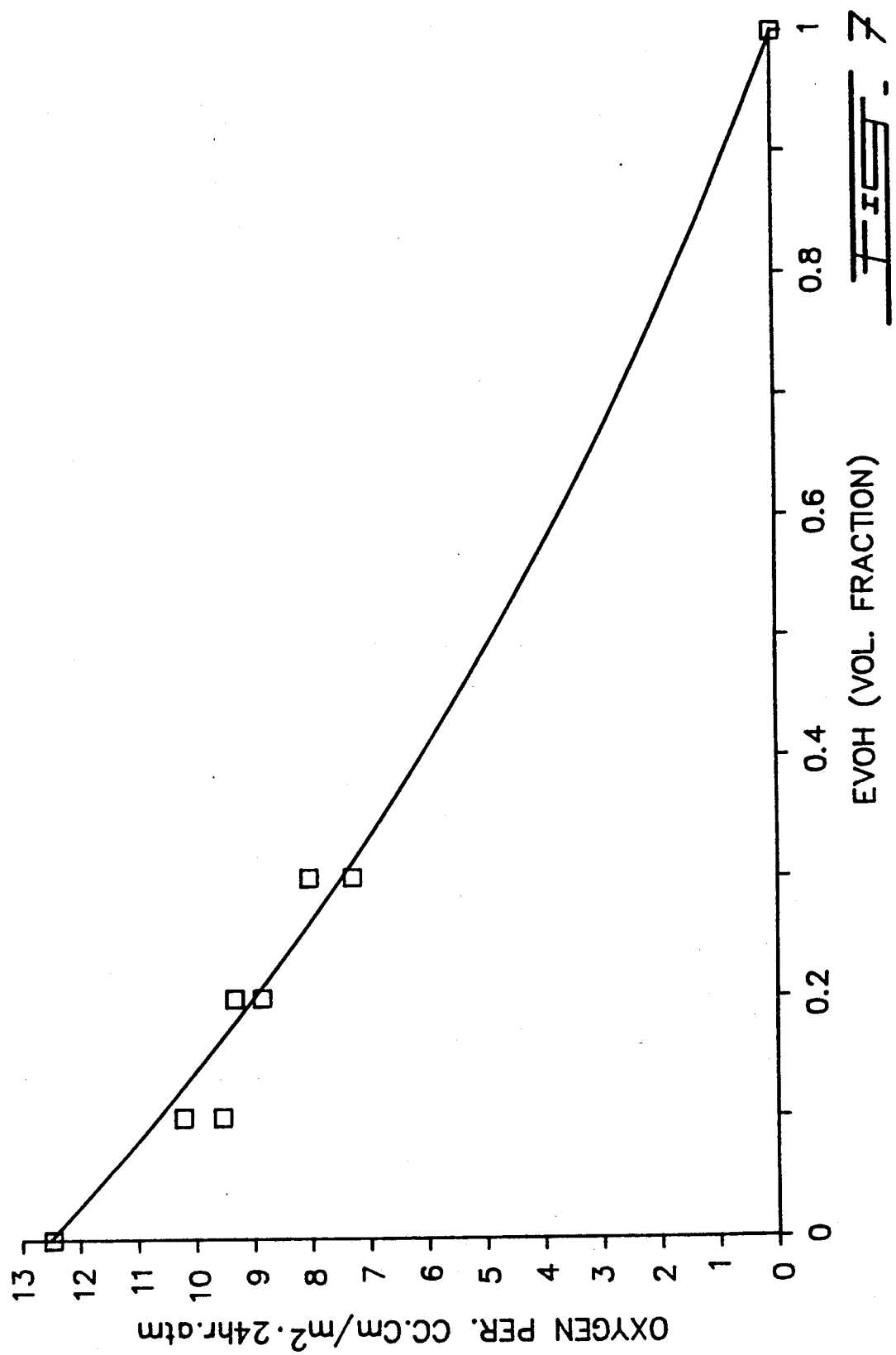
FIG. 7 is a graph showing the variation of the permeability to oxygen ($O_2$) of samples similar to those of FIGS. 6a–6d, in function of the volume fraction of EVOH in these samples.

Permeability to oxygen (O$_2$) of the compression molded samples is shown in FIG. 7. More specifically, FIG. 7 is a graph showing the variation of the permeability to oxygen (O$_2$) of samples similar to those of FIGS. 6a–6d, in function of the volume fraction of EVOH in these samples. The solid line is the prediction of Maxwell model (non-permeant spherical dispersed phase in a permeable matrix). The experimental results (rectangles) of FIG. 7 show that the permeability follows the predictions of the model up to a PP/EVOH or MAPP/EVOH volume ratio of 70/30.

EXAMPLE 2

Samples were prepared by placing in the batch mixer of example 1 dry blends of (a) PP, EVOH, and MEPR or (b) MAPP, EVOH, and MEPR. The PP/EVOH or MAPP/EVOH volume ratio was kept at 70/30. Mixing was carried out for 20 minutes at 200° C. under nitrogen, and sampling was according to the same procedures described above. The results of impact testing are shown in Table II. These data suggest that the impact properties of PP or MAPP blends with 30% by volume of EVOH and various levels of MEPR are generally lower than those of PP or MAPP alone.

TABLE II

| Composition (vol. %) | Force (lb) | (N) | Energy (in lb.) | (J) | Slope (lb/in) | (N/m) |
| --- | --- | --- | --- | --- | --- | --- |
| MAPP | 211 | 938 | 39 | 4.407 | 515 | 90221 |
| PP | 291 | 1294 | 39 | 4.407 | 614 | 107564 |
| Processed PP | 222 | 987 | 32 | 3.616 | 557 | 97579 |
| Processed MAPP | 162 | 721 | 34 | 3.8454 | 562 | 98501 |
| PP-EVOH-MEPR 49-21-30 | 112 | 498 | 5 | 0.565 | 514 | 90046 |
| PP-EVOH-MEPR 56-24-20 | 131 | 582 | 8 | 0.904 | 545 | 95476 |
| PP-EVOH-MEPR 63-27-10 | 148 | 658 | 9 | 1.017 | 567 | 99331 |
| MAPP-EVOH-MEPR 49-21-30 | 112 | 498 | 9 | 1.017 | 376 | 65870 |
| MAPP-EVOH-MEPR 49-21-30 | 110 | 489 | 9 | 1.017 | 477 | 83564 |
| MAPP-EVOH-MEPR 56-24-20 | 141 | 627 | 16 | 1.808 | 609 | 106688 |
| MAPP-EVOH-MEPR 63-27-10 | 162 | 720 | 21 | 2.373 | 638 | 111769 |

EXAMPLE 3

Samples were prepared by placing in the mixer of examples 1 and 2 dry blends (a) of pp, EVOH, MEPR, and high density PE or (b) MAPP, EVOH, MEPR, and PE. Mixing and sampling were according to the above procedures. The results of impact testing are shown in Table III. These results demonstrate that for PP based blends there is no improvement when compared to processed PP, but the energy is higher for those blends than the energy measured for the PP-EVOH-MEPR blend (56-24-20) of Table II, which do not include PE.

TABLE III

| Composition (vol. %) | Force (lb) | (N) | Energy (in lb.) | (J) | Slope (lb/in.) | (N/m) |
| --- | --- | --- | --- | --- | --- | --- |
| Processed PP | 222 | 987 | 32 | 3.616 | 557 | 97579 |
| Processed MAPP | 162 | 721 | 34 | 3.8454 | 562 | 98501 |
| PP-EVOH-MEPR-PE1 57-25-9-9 | 31 | 582 | 8 | 0.904 | 559 | 97929 |
| PP-EVOH-MEPR-PE1 52.5-22.5-12.5-12.5 | 102 | 453 | 5 | 0.565 | 437 | 76556 |
| MAPP-EVOH-MEPR-PE1 52.5-22.5-12.5-12.5 | 185 | 823 | 27 | 3.051 | 474 | 83038 |
| MAPP-EVOH-MEPR 60-26-14 Sequence #1 | 166 | 738 | 19 | 2.147 | 500 | 87593 |

Table III also indicates that MAPP based blends have better impact properties than the PP based ones, and that the force and energy are higher for the blends based on MAPP.

EXAMPLE 4

Samples were prepared by initially placing in the batch mixer dry blends of PP, EVOH and PE or MAPP, EVOH and PE. Mixing under nitrogen was carried out for 10 minutes. At the end of 10 minutes MEPR (sequence #1) or a masterbatch of MEPR and PE (sequence #2) was added and mixing was continued for 5 more minutes. Sampling and testing were according to the above procedure. The results of impact are shown in Table IV. These results show that the incorporation of MEPR and PE according to the sequence described here produces blends with impact properties comparable to those of processed PP and MAPP. Low levels of MEPR and PE (9) are inferior to the 12.5% levels.

TABLE IV

| Composition (vol. %) | Force (lb) | (N) | Energy (in lb.) | (J) | Slope (lb/in.) | (N/m) |
| --- | --- | --- | --- | --- | --- | --- |
| Processed PP | 222 | 987 | 32 | 3.616 | 557 | 97579 |
| Processed MAPP | 162 | 721 | 34 | 3.8454 | 562 | 98501 |
| MAPP-EVOH-MEPR-PE1 52.5-22.5-12.5-12.5 Sequence #1 | 249 | 1108 | 41 | 4.633 | 634 | 111068 |
| MAPP-EVOH-MEPR-PE1 52.5-22.5-12.5-12.5 Sequence #2 | 227 | 1010 | 32 | 3.616 | 675 | 118251 |
| MAPP-EVOH-MEPR-PE1 57-25-9-9 Sequence #1 | 179 | 796 | 28 | 3.164 | 488 | 85491 |
| MAPP-EVOH-MEPR-PE2 52.5-22.5-12.5-12.5 Sequence #1 | 215 | 956 | 36 | 4.068 | 446 | 78133 |

EXAMPLE 5

In this example, a single metering screw extruder having a diameter of 31.75 mm (1¼") and a 25:1 length-/diameter ratio was employed. The die and adapter illustrated in FIGS. 3a and 3b and described hereinabove were also used.

According to the standard operating procedure, the following sequence of steps was followed:

(a) The extruder and die were heated. When all temperatures reached their respective set points, the system was given 40 more minutes to stabilize.

(b) The blend system, containing a dry blend of the various ingredients in the specified ratios, was fed to the hopper and extruded for 15 minutes at specified conditions to allow for pressure stabilization before experimental data were collected.

(c) For each experiment, strip extrusions were collected. The extrusions were kept with a desiccant in sealed plastic bags under vacuum, and stored in a freezer to minimize microstructural changes with time.

The samples were subjected to morphological and permeability testing. To obtain specimens for morphological analysis, a piece of strip extrusion was marked at the location of interest. The sample was then frozen in liquid nitrogen for three minutes, and fractured at the marked location. The fracture surfaces were fixed onto a sample holder using colloidal graphite, and placed in a desiccator to dry for 24 hours. The sample holder was then placed in an Anatech Ltd. Hummer VI Sputtering System, where the sample was coated with a gold/palladium mixture under vacuum. Finally, the sample was inserted into a microscope chamber. The morphology was examined using a scanning electron microscope (SEM), type JEOL JSM-T300.

Figure 8A:
FIGS. 8a, 8b and 8c are SEM micrographs of pure PP, EVOH and MAPP1, respectively.
Figure 8B:
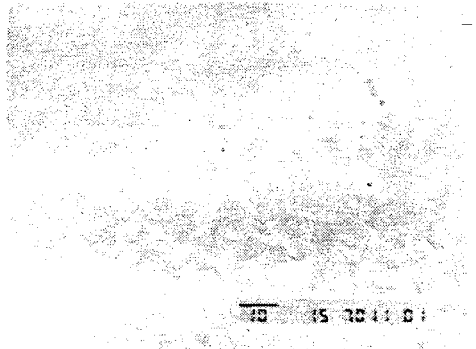
Figure 8C:
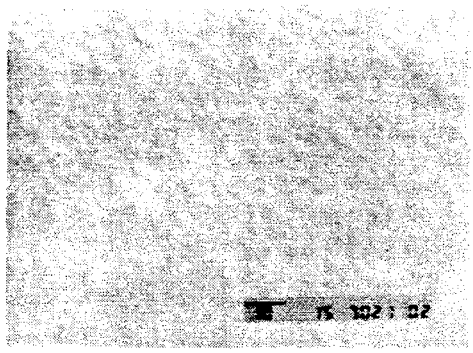
Figure 9A:
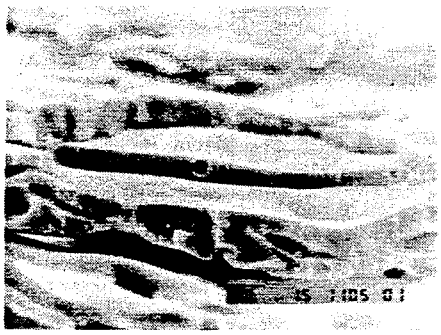
FIGS. 9a, 9b, 9c, 9d, 9e and 9f are SEM micrographs for PP/EVOH blends showing the influence of the weight ratio PP/EVOH and of the die temperature $T_{Die}$ on the laminar structure development in the core region of extrusions in accordance with the present invention.
Figure 9B:
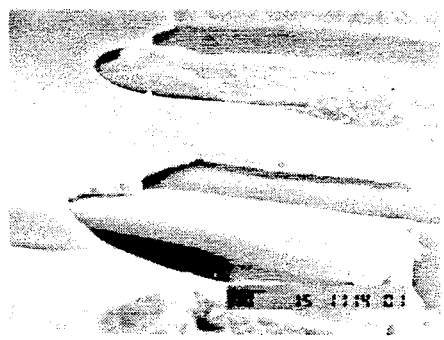
Figure 9C:
Figure 9D:
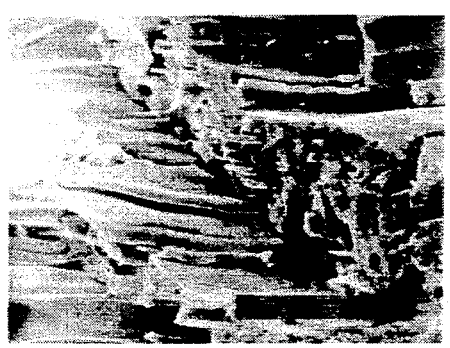
Figure 9E:
Figure 9F:
Figure 10A:
FIGS. 10a, 10b, 10c, 10d, 10e and 10f are SEM micrographs for PP/MAPP1/EVOH blends showing the variations of morphology across the thickness of the laminar extrusion for a 67.8/15.3/16.9 wt % composition ratio as a function of the die temperature $T_{Die}$.
Figure 10B:
Figure 10C:
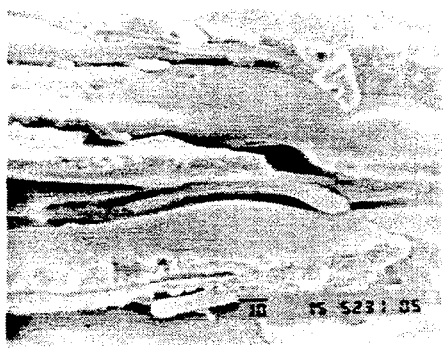
Figure 10D:
Figure 10E:
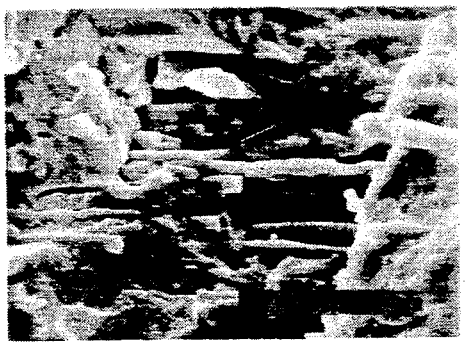
Figure 10F:

FIGS. 8a, 8b and 8c are SEM micrographs of pure PP, EVOH and MAPP1, respectively. These micrographs show generally homogeneous, one phase morphologies. In the case of MAPP1 (FIG. 8c), evenly distributed, very small, white inclusions are observed. These inclusions, however, are possibly additives incorporated by the manufacturer of the MAPP1 and do not appear to be associated with layered structures.

FIGS. 9a, 9b, 9c, 9d, 9e and 9f are SEM micrographs for PP/EVOH blends showing the influence of the weight ratio PP/EVOH and of the die temperature $T_{Die}$ on the laminar structure development in the core region of extrusions obtained in accordance with the above mentioned procedure. The metering screw was rotating at a speed of 60 rpm and the thickness of the gap of the slit die section was h=1.0 mm. All samples show a layered structure of the dispersed phase (EVOH) in the continuous matrix phase (PP).

FIGS. 10a, 10b, 10c, 10d, 10e and 10f are SEM micrographs for PP/MAPP1/EVOH blends showing the variations of morphology across the thickness of the laminar extrusion for a 67.8/15.3/16.9 wt % composition ratio as a function of the die temperature $T_{Die}$. The rotation speed of the metering screw was 30 rpm and the thichness of the gap h was again 1.0 mm. More specifically, these Figures show the variation of the morphology as a function of distance from the surface of the strip extrusion, at two different extrusion temperatures. These micrographs show the predominance of the layered structure and higher concentrations of EVOH in the core region of the strip extrusion, where they are best placed for barrier applications.

Figure 11A:
FIGS. 11a and 11b are SEM micrographs for a PP/MAPP2/EVOH blend showing the effect of the screw design of the extruder on the laminar structure development in the core region of the extrusion for a 71.4/10.7/17.9 wt % composition ratio.
Figure 11B:
Figure 12A:
FIGS. 12a, 12b, 12c, 12d, 12e and 12f are SEM micrographs for a PP/MAPP2/EVOH blend showing variations of morphology across the thickness of the extrusion as a function of the screw design of the extruder for a 71.4/10.7/17.9 wt % composition ratio.
Figure 12B:
Figure 12C:
Figure 12D:
Figure 12E:
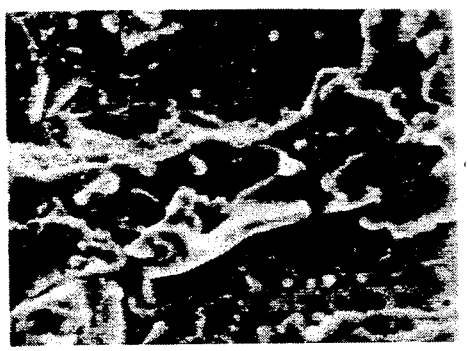
Figure 12F:
Figure 13A:
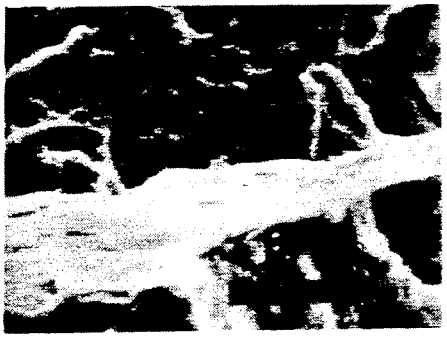
FIGS. 13a, 13b, 13c and 13d are SEM micrographs for a MAPP2/EVOH blend showing the effect of the MAPP2/EVOH weight ratio on the development of the laminar structure in the core region of the extrusion.
Figure 13B:
Figure 13C:
Figure 13D:
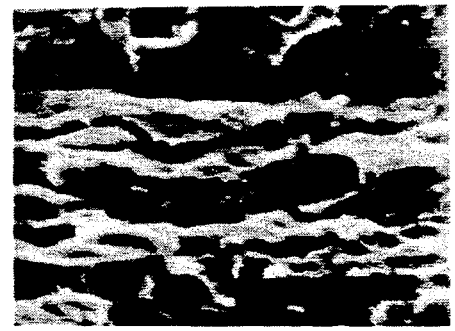

FIGS. 11a and 11b are SEM micrographs for a PP/MAPP2/EVOH blend showing the effect of the screw design of the extruder on the laminar structure development in the core region of the extrusion for a 71.4/10.7/17.9 wt % composition ratio. The temperature of the die unit was 230° C., the speed of the extruder screw 60 rpm and h was equal to 0.5 mm. FIGS. 11a and 11b more specifically show the effect of replacing the metering screw with a mixing screw on the morphology of the core region of strip extrusion produced at 230° C. The laminar structure persists, and the difference between the two screws is very small.

The general pattern of these observations was maintained when the throughput rate of the extruder was varied by changing the rotational speed of the screw from 30 to 90 rpm. The same patterns were noted when the die gap h was varied between 0.5 and 1.0 mm.

The above results indicate that the laminar structure is obtained consistently over a reasonably broad range of blend compositions, processing conditions, and screw designs.

EXAMPLE 6

In order to improve the adhesion at the interface of the layers, MAPP was employed instead of PP at various levels. FIG. 12a, 12b, 12c, 12d, 12e and 12f show that the incorporation of MAPP improved the adhesion, while the laminar morphology is maintained in the core region. The laminar structure in the core and the adhesion are maintained over a broad range of compositions and with both the metering and mixing screws, as also noted in FIGS. 13a, 13b, 13c and 13d.

FIGS. 12a, 12b, 12c, 12d, 12e and 12f are SEM micrographs for a PP/MAPP2/EVOH blend showing variations of morphology across the thickness of the extrusion as a function of the screw design of the extruder for a 71.4/10.7/17.9 wt% composition ratio (the die temperature was 230° C., the screw speed 60 rpm and the gap thickness h 0.5 mm), while FIGS. 13a, 13b, 13c and 13d are SEM micrographs for a MAPP2/EVOH blend showing the effect of the MAPP2/EVOH weight ratio on the development of the laminar structure in the core region of the extrusion (the die temperature was 2150° C., the screw speed 60 rpm and the gap thickness h 0.5 mm.

EXAMPLE 7

Strip extrusion produced in accordance with the above procedure were tested with regard to permeability to oxygen. The permeabilities were determined using a Mocon coulometric oxygen detector, in a device similar to ox-Tran Model 100. This device consists of a cell, which is separated into two chambers by the sample ribbon. One side of the sample is flushed with oxygen, and the other side with a dry nitrogen carrier gas containing 3% hydrogen. The cell was operated at 25.0±0.16 with a circulating water bath. Any oxygen molecules diffusing through the film are carried, by the carrier gas, to the sensor, which reacts electrochemically to produce an electric current that is monitored by a data acquisition system. This current is directly proportional to the mass flow rate of oxygen entering the sensor. The mass flow rate of oxygen is recorded as cc.mm/m$^2$.24hrs.atm., and designated as PO$_2$.

FIG. 14 shows the effect of incorporation of various amounts of EVOH in a blend of MAPP2/EVOH on the oxygen permeability PO$_2$, using different screws and various processing conditions. The results show that at 30% EVOH levels, the permeability is reduced by over 70% under some processing conditions. At 30% by weight EVOH, the corresponding volumetric fraction is approximately 24%.

FIG. 15 shows that, at this EVOH level, the value of PO$_2$ is significantly below the value normally obtained by plain mixing when the EVOH usually appears as spherical dispersed particles. The dotted line in FIG. 15 shows the expected results when a batch mixer is used. These results have been confirmed experimentally. The data on the dotted curve suggest that if a batch mixer is used instead of the extruder and die system employed in this study, the permeability at 24% by volume EVOH would be 35 cc.mm/m$^2$.24hrs.atm. This is equivalent to over twice the oxygen permeability obtained in our extrusion experiments. In FIG. 15, the triangles are results related to specimen produced by means of a batch mixer while the rectangles are results related to extrusions in accordance with the present invention.

FIG. 15 also has a solid line which represents the expected values of PO$_2$, if continuous laminar structures are formed, as in the case of co-extrusion. The extrusion results consistently fall between the batch mixing (dotted) line and the co-extrusion (solid) line. At 20% and 24% by volume EVOH, it is apparent that the extrusion results approach more closely the co-extrusion line, reflecting higher efficiency of the laminar structure.

Although PP and MAPP are mentioned hereinabove as the matrix phase, other materials such as polyolefins, including polyethylene, polybutylene, and copolymers of ethylene, propylene or butylene can also be used. Polyethylene could include high, medium, low and linear low density polyethylene. Furthermore, the matrix phase could include any of the above polymers which has been modified so that it becomes an alkylcarboxyl-substituted polyolefin by attaching to it carboxylic moieties. Additionally, the continuous, matrix phase might itself consist of a blend of an unmodified polyolefin with the modified alkylcarboxyl-substituted polyolefin.

As the dispersed phase, EVOH (as mentioned in the foregoing description) and also extrudable polyvinylidene chloride can be used. These two materials exhibit excellent gas barrier characteristics. However, it is also possible to have as the dispersed phase condensation polymers such as polyamides and polyesters, including polyethylene terephthalate and polypropylene terephthalate.

It is important for the formation of the layered structure that the matrix and dispersed phases are incompatible, that is the dispersed phase should form discrete inclusions in the matrix phase and it should not dissolve completely in it. However, a certain degree of compatibility to achieve adhesion at the interface of the two phases is highly advantageous.

Although the present invention has been described hereinabove by way of preferred embodiments thereof, such embodiments can be modified at will, within the scope of the appended claims, without departing from the spirit and nature of the subject invention.

What is claimed is:

1. A process for producing a laminar polymer extrusion, comprising the steps of:
   preparing a molten blend including bodies of a first polymer phase dispersed in a matrix polymer phase incompatible with the said first phase;
   extruding the molten blend to produce the said extrusion, said molten blend being extruded through a die unit structure to produce a flow of said molten blend that lengthens, during extrusion, the dispersed bodies of the first polymer phase both in a first direction and in a second direction transversal to said first direction to produce in the extrusion a laminar structure including overlapping layers of said first polymer phase dispersed in the said matrix phase; and solidifying the extruded blend sufficiently rapidly to preserve the laminar structure.

2. The process of claim 1, in which said extruding step comprises extruding the molten blend through a die unit structured to produce (a) a converging extensional flow of the molten blend to lengthen in the first direction the dispersed bodies of said first polymer phase, and (b) a diverging extensional flow of the molten blend to lengthen in the second direction the dispersed bodies of said first polymer phase.

3. The process of claim 1, in which the molten blend which is prepared further includes a compatibilizing agent to improve adhesion between the dispersed layers of said first polymer phase and the matrix phase.

4. The process of claim 1, in which the molten blend which is prepared further includes an impact modifying agent mixed with the first phase and/or the matrix phase for adjusting as desired the mechanical properties of the extrusion.

* * * * *